Feb. 24, 1931.    G. L. KNOX    1,793,808
FIFTH WHEEL
Filed June 18, 1929

Inventor
Garner L. Knox
By Lyon & Lyon
Attorneys

Patented Feb. 24, 1931

1,793,808

UNITED STATES PATENT OFFICE

GARNER L. KNOX, OF GLENDALE, CALIFORNIA, ASSIGNOR TO UTILITY TRAILER MANUFACTURING CO., OF LOS ANGELES, CALIFORNIA, A CORPORATION OF CALIFORNIA

FIFTH WHEEL

Application filed June 18, 1929. Serial No. 371,868.

This invention relates to fifth wheels, and more particularly to a construction of fifth wheel for dirigibly mounting the wheels of a trailer or like structure.

In the construction of trailers many forms of construction have been provided for dirigibly mounting the forward wheels of such a structure to permit the same to turn or provide steering wheels. One form of this structure that has heretofore been provided is to mount the steering wheels upon spindles to permit the same to turn in relation to the carrying axle, the wheels being tied together by a tie-bar so that as one of the forward wheels, or set of forward wheels, is turned, the other is caused to turn a corresponding amount. Fifth wheel constructions have heretofore been common in the art, particularly in the construction of wagons and like equipment.

In the construction of trailers which are formed to carry extremely heavy loads, it has been found that the old and common type of fifth wheel construction was inadequate due to the inability to turn such a fifth wheel because of the excessive friction created between the elements of such a fifth wheel construction. In fact, when employing such structures it has been found that it was impossible for several men to swing the tongue of the trailer. In endeavoring to overcome this deficiency of the common fifth wheel structure, small friction rollers have been employed between the plane circle plates of such a structure, but it has been found that these small rollers soon seated themselves and that the resultant structure was less efficient and more difficult to operate than when using only the plane circle plates.

It is therefore an object of this invention to provide a fifth wheel structure which includes a central or main radial thrust bearing upon which a portion of the load is supported, and which fifth wheel construction also includes a hardened steel bearing plate which is engaged by a plurality of supporting rollers mounted at points removed from the radial thrust bearing and so mounted that their points of application lie in the same plane with the plane of rotation of the fifth wheels around the main centrally located radial thrust bearing.

Another object of this invention is to provide a fifth wheel structure for use in trailers or like vehicles which includes a main axially located thrust bearing around which the fifth wheel rotates and a plurality of hardened steel rollers spaced radially from the centrally located thrust bearing and adapted to engage a hardened steel bearing plate; the bearing contact between the hardened steel rollers and bearing plate lying in a plane parallel with the bed of the trailer so that the hardened steel rollers form a bearing contact with the hardened steel plate at the same time that the load is imposed upon the centrally located radial thrust bearing.

Other objects and advantages of this invention it is believed will be apparent from the following detailed description of a preferred embodiment thereof as illustrated in the accompanying drawings:

Figure 1:
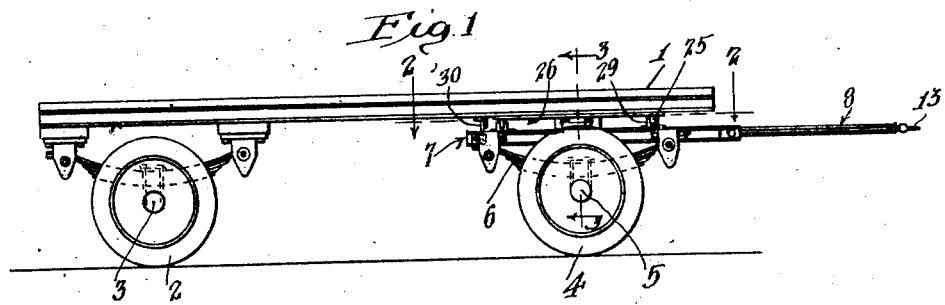
Figure 1 is a side elevation of the fifth wheel construction embodying this invention.
Figure 2:
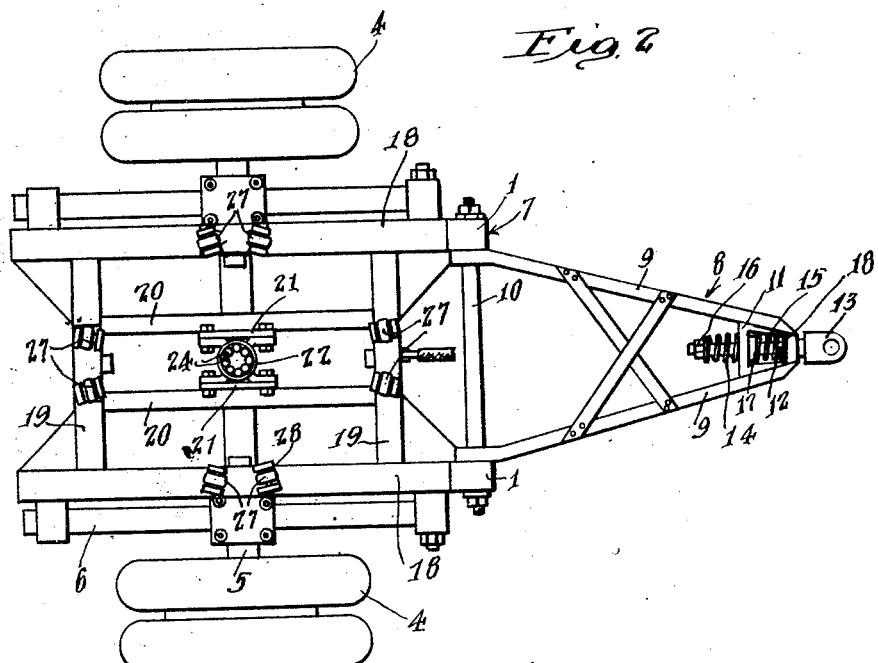
Figure 2 is a top plan view taken substantially on the line 3—3 of Figure 1.
Figure 3:
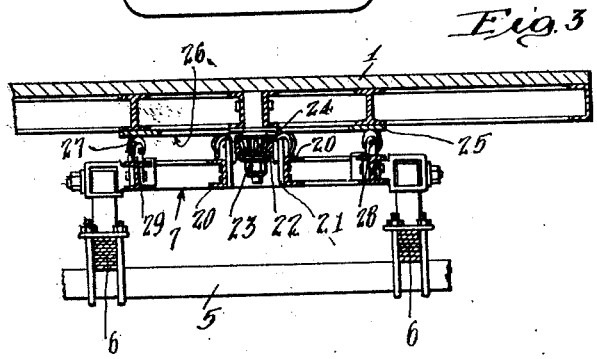
Figure 3 is a sectional view taken substantially on the line 3—3 of Figure 1.

In the preferred embodiment of this invention illustrated in the accompanying drawings, 1 illustrates the bed of a trailer or like structure which is supported by rear wheels 2 carried upon a rear axle 3 in any suitable or desirable manner, as is well understood in the art. The forward, or steering wheels 4, are journaled upon an axle 5. The axle 5 is secured to springs 6 intermediate the ends of the springs. The ends of the springs 6 are secured in any suitable or desirable manner to a subframe 7. The ends of the spring 6 may be secured to the sub-frame 7 in any suitable or desirable manner such, for example, as by the use of shackles to permit relative elongation of the springs 6 as the same are depressed to reduce the curvature of the springs 6 as is well understood in the art.

The sub-frame 7 is secured to any suitable form of tongue structure 8, which is herein illustrated as including a pair of diverging bars 9 which are pivotally mounted at their ends on a rod 10 secured to the sub-frame 7. The diverging bars 9 are secured at their forward end to a casting 11. A tongue rod 12 passes through the casting 11 and is provided with a connecting head 13 at its forward end. The rod 12 is provided with springs 14 and 15 which yieldably hold the rod 12 in position permitting the same to move longitudinally relative to the tongue 8 yieldably against the tension of the springs 14 and 15 as may be required to take up shocks imposed by sudden jerks of the motive or pulling structure.

The spring 15 is mounted within the casting 11, and the spring 14 is mounted on the rod 12 to engage a nut 16 secured to the end of the rod 12 at one end and the end of the casting 11. The spring 15 engages the back web of the casting 11 at its end 17, and an abutment 18 is secured to the rod 12 in position to engage the opposite end of the spring. In this manner the rod 12 is resiliently held in position so that the springs 14 and 15 absorb shocks which might otherwise be imposed upon the trailer either on backing or pulling the same ahead. The sub-frame 7 is formed of two spaced longitudinally extending channel irons 18 which are connected together transversely by means of a pair of I-beams 19. The I-beams 19 are secured together by means of a pair of intermediate longitudinally extending channel irons 20. Secured to the intermediate channel irons 20 are brackets 21 which support a bearing cone socket 22 axially vertically of the sub-frame 7.

Carried by the bed 1 of the trailer or other similar structure is a conical roller bearing 23 which fits within the socket 22 and provides the main supporting bearing for the bed 1. The conical roller bearing 23 is of the radial thrust type and is formed conically so that the rollers 24 of the said bearing, when engaged within the socket 22, support a major portion of the load on the bed 1 and the merchandise or other material mounted thereon.

Means are provided for preventing tipping of the bed 1 as the same is supported by the radial thrust bearing 23 and for supporting a portion of the load carried by the bed 1, which means are preferably of the following construction.

Secured to the bed 1 is a hardened steel bearing plate 25 which is treated to provide at its contacting surface 26 a hardened bearing surface against which bearing rollers 27 engage. The bearing rollers 27 are journaled on pins 28 carried by brackets 29. The brackets 29 are positioned radially from the main thrust bearing 23 and are secured to the members 18 and 19 of the sub-frame 7. Four of such brackets are preferably provided spaced at diametrically opposed points in relation to the radial thrust bearing 23, and each of the brackets 29 may carry one or more rollers 27 as desired, depending upon the weight of the bed 1 and load to be carried thereby. The rollers 27 are also treated so that their periphery is of hardened steel, and the rollers 27 are preferably of material size. The hardening of the rollers 27 and bearing plate 25 and the formation of the rollers 27 of material size or relatively large, insures that the rollers 27 will not seat themselves in pockets in the bearing plate 25 under conditions of use.

The rollers 27 are positioned so that their plane of contact with the bearing plate 25 is normally located under no load conditions of the bed 1 to support a portion of the load of the bed 1 and relieve a portion of this load from the radial thrust bearing 23. That is, the plane of bearing contact of the rollers 27 within the bearing plate 25 is so situated that there is a bearing contact as soon as the bed 1 of the structure is lowered so that the conical bearing 23 engages within the conical bearing race 22.

In order to prevent the turning wheels from rotating too far and thus permitting the trailer to turn over, a stop is provided consisting of a depending stop arm 30 secured to the bed 1 in position to engage the sides of the longitudinally extending members 18 of the sub-frame 7, and thus limit the turning radius of the steering wheels.

Having fully described my invention, it is to be understood that I do not wish to be limited to the details herein set forth, but my invention is of the full scope of the appended claim.

I claim:

In a device of the class described, the combination of a frame, a radial thrust bearing secured to the frame, a steering axle, a rectangular subframe, means secured to the steering axle for suspending said steering axle from the rectangular subframe, a radial thrust bearing race axially of the rectangular subframe into which the radial thrust bearing is fitted, bearing rollers mounted on horizontally disposed axes at substantially the midpoint of the four sides of the rectangular subframe, the bearing rollers having hardened steel peripheries, and a rectangular bearing race secured to said frame in position to engage said rollers so that said rollers carry a portion of the load and relieve the radial thrust bearing.

Signed at Los Angeles, California, this 27th day of May, 1929.

GARNER L. KNOX.